US011164275B2

(12) United States Patent
Shen et al.

(10) Patent No.: US 11,164,275 B2
(45) Date of Patent: Nov. 2, 2021

(54) FLEXIBLE API FRAMEWORK

(71) Applicant: Lyft, Inc., San Francisco, CA (US)

(72) Inventors: Limin Shen, San Francisco, CA (US); Michael Lodick, San Francisco, CA (US); Wei You, San Francisco, CA (US); Jeff Pinner, San Francisco, CA (US)

(73) Assignee: LYFT, INC., San Francisco, CA (US)

( * ) Notice: Subject to any disclaimer, the term of this patent is extended or adjusted under 35 U.S.C. 154(b) by 817 days.

(21) Appl. No.: 15/395,838

(22) Filed: Dec. 30, 2016

(65) Prior Publication Data
US 2018/0189917 A1     Jul. 5, 2018

(51) Int. Cl.
  *G06Q 50/30*   (2012.01)
  *H04W 4/029*   (2018.01)
  *H04W 4/02*    (2018.01)

(52) U.S. Cl.
  CPC ............ *G06Q 50/30* (2013.01); *H04W 4/029* (2018.02); *G06Q 2240/00* (2013.01)

(58) Field of Classification Search
  USPC .................... 705/7.21, 13; 709/225; 719/312
  See application file for complete search history.

(56) References Cited

U.S. PATENT DOCUMENTS

| 2013/0339980 | A1* | 12/2013 | Meshar | G06F 9/541 |
| | | | | 719/312 |
| 2014/0129302 | A1* | 5/2014 | Amin | G06Q 30/0641 |
| | | | | 705/13 |
| 2016/0134556 | A1* | 5/2016 | Flier | H04L 47/70 |
| | | | | 709/225 |
| 2016/0189283 | A1* | 6/2016 | Agrawal | G06Q 50/30 |
| | | | | 705/7.21 |

* cited by examiner

*Primary Examiner* — Peter Ludwig
*Assistant Examiner* — Reva R Moore
(74) *Attorney, Agent, or Firm* — Keller Jolley Preece

(57) ABSTRACT

Embodiments provide approaches to selectively integrate with various providers based on reliability factors, user preferences, and/or other criteria. For example, a user in a location where an on-demand provider is available may attempt to utilize services provided by the on-demand provider in a different location where the on-demand provider has limited or no services available, but where one or more other on-demand providers may be available. The user may attempt to access services provided by the on-demand provider using an application provided by the on-demand provider. However, in the situation where the user is in the location where services provided by the on-demand provider are not available, the user would have to secure other means of accessing those services. In such a situation the user may be able to utilize the application to request services with at least one partner on-demand provider. This can include, for example, enabling the user to use the application to access such services, and thus maintain a familiar front-end user experience, while on the backend a flexible application program interface (API) framework is utilized to enable requests to partner on-demand providers who can satisfy requests on behalf of the on-demand provider.

20 Claims, 10 Drawing Sheets

FLEXIBLE API FRAMEWORK

BACKGROUND

Users are increasingly utilizing electronic devices to perform various types of tasks. For example, an on-demand service matching system can provide a platform to enable users to request an on-demand service through use of computing devices. Service providers can operate computing devices to communicate with the on-demand service matching system and receive requests to perform the on-demand services for requesting users. The on-demand service matching system can perform various operations to determine which service providers to assign to which requesting users based on location information received from the computing devices operated by both services providers and requesting users, respectively. However, in certain situations, a user may be located in a region where service providers for a particular on-demand service are not available to fulfill requests. The lack of the available service may cause the user to use a different (e.g., partner, competitor, etc.) on-demand provider that has service in that region. As such, the user may switch on-demand providers or at least split use of services based on availability, cost, and/or other factors. This can result in fewer users using the on-demand service matching system, which may result in lost profits, as well as inefficient resource usage as the resources of the on-demand service are utilized for only certain request locations. Additionally, as such services have become more prevalent, and more users are interacting with these services on a global level, it may be desirable to determine approaches to leverage the network of partner or other on-demand providers to provide a unified service to users.

BRIEF DESCRIPTION OF THE DRAWINGS

Various embodiments in accordance with the present disclosure will be described with reference to the drawings, in which.

DETAILED DESCRIPTION

Figures 1A, 1B:
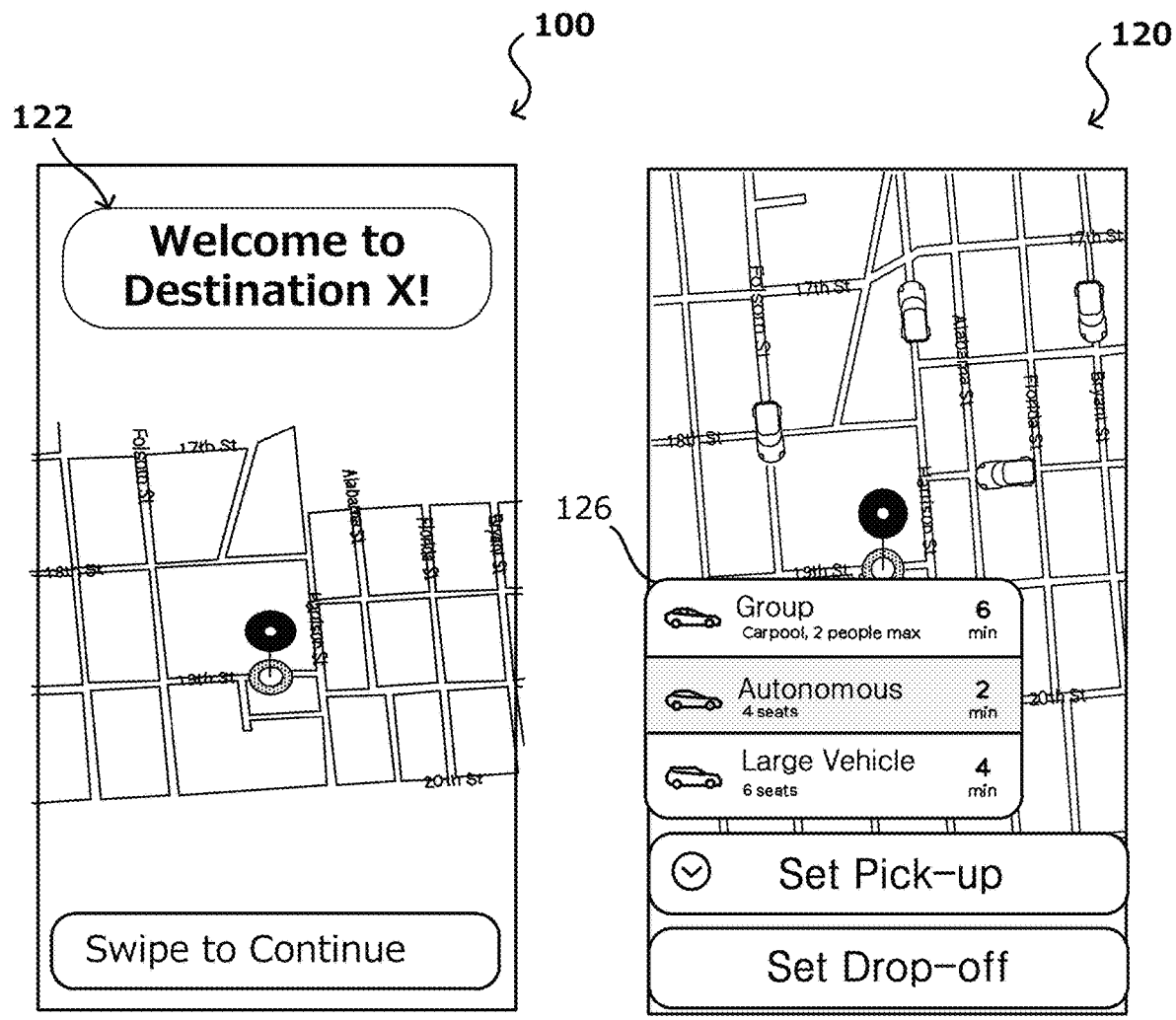
FIGS. 1A and 1B illustrate an example where a user is attempting to request an on-demand service in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the above-referenced and other deficiencies in conventional approaches to access services provided by one or more service providers. In particular, various embodiments provide for selectively integrating with various service providers (e.g. on-demand service providers) based on reliability factors, security concerns, user preferences, and/or other criteria. For example, a user in a first location where a first on-demand provider is available may attempt to utilize services provided by the first on-demand provider in a second location where the first on-demand provider has limited or no services available, but where one or more other on-demand providers may be available. In this example, the user may attempt to access services provided by the first on-demand provider using an application provided by the first on-demand provider. However, in the situation where the user is in the second location—where services provided by the first on-demand provider are not available, the user would have to secure other means of accessing those services. In accordance with various embodiments, the user may be able to utilize the application to request services with one or more partner on-demand providers. This can include, for example, enabling the user to use the application to access such services, and thus maintain a familiar front-end user experience, while on the backend a flexible application program interface (API) framework is utilized to enable requests to partner on-demand providers who can satisfy requests on the first on-demand services behalf.

For example, in accordance with various embodiments, when it is determined that the application is active, geographic location information associated with the user's computing device can be determined and provided to a management system or other on-demand service matching system associated with the first on-demand service. The geographic location information can be used to determine a geographic region. In an embodiment, in the situation where the first on-demand provider does not provide service in that geographic region, any request submitted through the application can be fulfilled by a partner on-demand provider. This can include, for example, determining at least one partner on-demand provider associated with the geographic region. The management system can communicate using APIs associated with the partner on-demand provider. In various embodiments, the management system can store mapping information that maps these requests to the appropriate partner's API. As will be described further herein, the mapping can be based on a set of rules, where some aspects of a request may be fulfilled by the partner on-demand provider and other aspects of the request may be fulfilled by the first on-demand provider or other partner on-demand provider. For example, the management system may select and provide requests to partner on-demand providers based the location, security concerns, and status of service providers near a request location. Accordingly, the management system may monitor system resources and control efficient resource allocation based on demand-matching between requestors and partner on-demand providers distributed through a geographic area. In response to the request, partner information can be obtained. The partner information can include sufficient data to determine partner services, availability of partner providers, among other such information. Thereafter, a request can be submitted to the partner on-demand service requesting a service such as a ride, monitor the status of a matched ride, pay for a ride, monitor past rides, perform any other requestor-oriented services related to the on-demand provider, and/or obtain any other requestor-oriented information from the on-demand provider and/or partner on-demand provider.

Various other such optimizations can be utilized as well within the scope of the various embodiments as would be apparent to one of ordinary skill in the art in light of the teachings and suggestions contained herein.

FIG. 1A illustrates an example 100 where a user is attempting to request a service provided by an on-demand provider in accordance with various embodiments. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others.

In this example, the user (e.g., a requestor) may have a computing device (e.g., a requestor computing device) that may be used to request services (e.g., a ride or transportation service, a delivery service, etc.) provided by a provider such as an on-demand provider. When a request is received at the on-demand provider, the on-demand provider may be able to contact available service providers and match the request with an available service provider. For example, the request can be received at a management system associated with the on-demand provider. A transport subsystem of the management system can be configured to communicate with both requestor computing devices and provider computing devices. The "requestor" may use an application such as a transport matching application executing on a requestor computing device to request transportation from a specified pick-up location. The request may be transmitted over a communication network to the management system. The transport subsystem may identify available providers that are registered with the management system through an application on a respective provider computing device. The management system may send the request to a provider communication device and the provider may accept the request through the provider communication device. The provider and the requestor may be matched and both parties may receive match information associated with the other respective party including name, request location, destination location, respective computing device location, rating, past ride history, and/or any other relevant information for facilitating the match and/or service being provided. The transport subsystem can monitor the location of the respective requestor computing device and provider computing device and send location information to the respective other device. Thus, as the provider computing device gets closer to the request location, the transport subsystem may monitor the location of the provider computing device and may send the location of the requestor computing device to the provider computing device. As such, the provider computing device may receive the location of the requestor computing device to allow the provider to identify the specific location of the requestor. Thereafter, the provider can pick-up and satisfy the transport request.

However, in certain situations, a user may be located in a region where service providers for a particular service offered by the on-demand provider are not available to fulfill requests. For example, the user may be in a region where the on-demand provider provides limited or no service. In such a situation, the user may decide to use a different on-demand provider (i.e., a competitor on-demand provider.) As such, the user may switch on-demand providers or at least split use of providers based on availability, cost, and/or other such factors. Additionally, in certain embodiments, the user may desire a service not provided by the on-demand provider at the time of the request. For example, the user may require a vehicle of a certain size, make, style, etc. that is not currently available.

Accordingly, embodiments provide for selectively integrating with various partner on-demand providers based on reliability factors, security concerns, user preferences, and/or other criteria to fulfill request that otherwise may not have been satisfied. For example, when it is determined that the application is active, location information associated with a location of the requestor computing device can be used to determine whether the user is in a region where the on-demand provider has limited or no service offerings. In such a situation, various embodiments provide for selectively integrating with various partner on-demand providers based on reliability factors, security concerns, user preferences, and/or other criteria. As shown in FIG. 1A, an interface that includes a welcome page 102 is displayed, as the user is attempting to use the application in a region where service is limited or not available. In this example, instead of the user having to access a different on-demand provider's service offerings, the user can be provided access to services provided by one or more partner on-demand providers via the application. For example, as shown in FIG. 1B, the user is able to request services 126 via the application, where the services can be offered by one or more partner on-demand providers. In this example, the user can request a carpool, an autonomous vehicle, or a large vehicle service.

Figure 2:
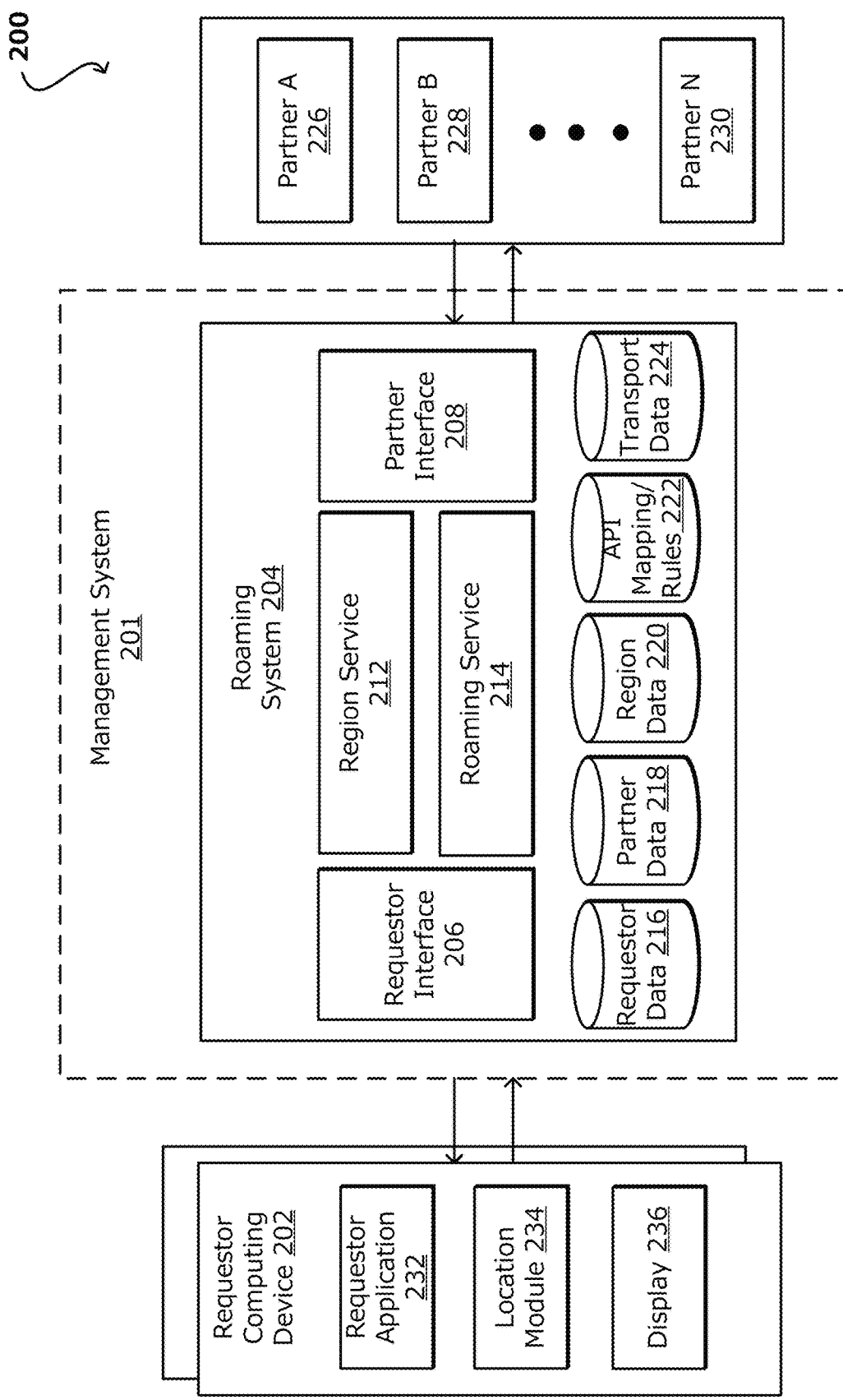
FIG. 2 illustrates an example system for incorporating services provided by one or more on-demand providers in accordance with various embodiments.

Incorporating services provided by partner on-demand providers includes utilizing a flexible application program interface (API) to selectively make requests to partner on-demand providers. FIG. 2 illustrates an example system 200 for incorporating services provided by one or more on-demand providers in accordance with various embodiments. In this example, management system 201 may identify and facilitate request matching from a requestor associated with a requestor computing device 202 with available service providers ("providers") associated with provider computing devices and a partner on-demand provider. In accordance with various embodiments and as described herein, a partner on-demand provider also referred to as a partner provider, partner, and/or service provider, can be any entity directly or indirectly providing service and/or resources to provide a service such as a transport service or other such service. One example provider includes an entity that enables access through, e.g., software to make a request with one or more services providers to view information associated with one or more service providers and/or utilize services provided by the services providers. Such a provider may utilize API requests to facilitate or otherwise interact with various other service providers to aggregate those services. Another example includes an entity that provides one or more resources, e.g., vehicles, software, among other such resources to fulfill a request such as a transport request. Example services include a transport service, a delivery service (e.g., a food and/or beverage delivery service), a personal care service (e.g., mental and physical therapy service, grooming service, fitness service, etc.), a daycare service, among other such services.

The management system 201 may include roaming system 204 that includes a requestor interface 206, a partner interface 208, a region service module 212, and a roaming service module 214. The management system 201 may also include a requestor information data store 216, a partner information data store 218, a region data store 220, an API mapping information/rule data store 222, and a transport data store 224. The data stores can be accessed by any of the modules of the roaming system 204 to obtain information in order to perform the functionality of the corresponding module. The management system 201 can be configured to communicate with at least one requestor computing device 202, at least partner on-demand provider (226,228,230) and associated partner service providers (not shown), and service providers (not shown) associated with the management system. Although the management system 201 is shown in a single system, the management system 201 may be hosted on multiple server computers and/or distributed across multiple systems. Additionally, the modules may be performed by any number of different computers and/or systems. Thus, the modules may be separated into multiple services and/or over multiple different systems to perform the functionality described herein.

It should be noted that although embodiments may be described in reference to transportation ("transport") requests, any number of different services may be provided through similar requests and matching functionality. Accordingly, embodiments are not limited to the matching of transport requests and one of ordinary skill would recognize that embodiments could be implemented for any number of different services that have requestors and providers being matched through a network of connected computing devices.

The requestor interface 206 may include any software and/or hardware components configured to send and receive communications and/or other information between the management system 201 and a plurality of requestor computing devices. The requestor interface 206 may be configured to facilitate communication between the management system 201 and respective requestor applications operating on each of a plurality of requestor computing devices. The requestor interface 206 may be configured to periodically receive transport requests, location information, a geographic request location (also referred to as a "pick-up" location), requestor status information, a location of the requestor computing device, and/or any other relevant information from the requestor computing device 202 when the requestor application 232 is active on the requestor computing device 202. The transport request may include a requestor identifier, location information for the requestor computing device 202, a pick-up location for the request, one or more destination locations, a pick-up time, and/or any other suitable information associated with providing a service to a requestor. The request may be sent in a single message or may include a series of messages. Additionally, the requestor interface 206 may be configured to send transport match messages, location information for partner and other provider computing devices, partner and provider information, travel routes, pick-up estimates, traffic information, requestor updates/notifications, and/or any other relevant information to the requestor application 232 of the requestor computing device 202. The requestor interface 206 may update a requestor information data store 216 with requestor information received and/or sent to the requestor, a status of the requestor, a requestor computing device location, and/or any other relevant information.

The roaming system 204 may receive one or more requests from requestor application 232 and send the request (s) to one of the partner on-demand providers. For example, when request application 232 is active, geographic location information obtained from location module 234 and associated with the requestor computing device 202 can be provided to requestor interface 206. Region service 212 can use the geographic location information to determine a geographic region associated with the geographic location information. For example, the geographic location information can correspond to a global address, such as a latitude and longitude angels. Latitude and longitude angles can uniquely define points on a sphere and together, the angles comprise a coordinate scheme that can locate or identify geographic positions on the surfaces of planets such as the earth. The geographic location information can be compared to geographic location data stored in region data store 220 to determine a geographic region. Also stored in region data store 220 can be partner on-demand providers associated with regions. In accordance with various embodiments, partnerships between the management system 201 and on-demand providers can be established in any one of a number of ways, where partner on-demand providers provide similar and/or different services. The requestor application can be utilized to access services offered by the partner on-demand providers.

Region service module 212 can determine at least one partner on-demand provider associated with a geographic region. For example, one or more partner on-demand providers can be displayed on display screen 236 of the requestor computing service. A selection or other indication of one of the partner on-demand providers can be received. In another example, requestor data store 216 can be accessed to determine whether the requestor application is associated with user preferences indicating a preferred partner on-demand provider. Once an indication of one or more preferred partner on-demand providers is received, a determination can be made whether terms of service have been accepted for the partner on-demand provider for a user account associated with the requestor application 232. In the situation where the terms of service have not been accepted, the terms of service can be displayed on display screen 236 of the request computing device 202. If more than one partner on-demand provider is selected, the terms of service of those providers is provided for acceptance in turn.

Once the terms of service have been accepted, or determined to have previously been accepted, the requestor application can display a request interface. The transport request interface can be configured to facilitate communications with the management system 201 and interface with the user (i.e., requestor) of the requestor computing device 202. The transport request interface may allow a user to request a service such as a ride, monitor the status of a matched ride, pay for a ride, monitor past rides, perform any other requestor-oriented services related to the management system 201, and/or obtain any other requestor-oriented information from the management system 201 and/or partner on-demand providers. In various embodiments, the transport request interface can display the services provided by the partner on-demand providers. The requestor computing device 202 may include any device that is configured to communicate with the management system 201 over one or more communication networks. The requestor computing device 202 may comprise a processor, a computer-readable memory, and communication hardware and/or software to allow the requestor computing device 202 to communicate over the communication networks. For example, a requestor computing device 202 may include a mobile phone, a tablet, a smart watch, a laptop computer, a desktop computer, and/or any other suitable device having a processor, memory, and communication hardware.

Partner interface 208 may include any software and/or hardware configured to send and receive communications and/or other information between the management system 201 and partner on-demand providers (226, 228, 230), each of which may have a plurality of providers (e.g., partner providers) having respective partner computing devices operable to run a partner application. The partner interface 208 may be configured to periodically receive location information of partner computing devices, provider partner status information (e.g., active, offline, etc.), and/or any other relevant information from a partner computing devices when a partner application is active on the partner computing device. Additionally, the partner interface 208 may be configured to send service requests, location information of a requestor computing device 232, pick-up locations, suggested travel routes, pick-up estimates, traffic information, partner provider updates/notifications, and/or any other relevant information to an appropriate partner application of a partner computing device. The partner interface 208 may update a partner information data store 218 with partner information received and/or sent to the partner on-demand providers and/or partner computing devices, partner provider profile information, a status of the partner provider, a partner provider computing device location, and/or any other relevant information.

A partner provider computing device may include any computing device that is configured to communicate with a partner on-demand system and/or management system 201 over one or more communication networks. The partner provider computing device may comprise any device that includes a processor, a computer-readable memory, and communication hardware and/or software to allow the partner provider computing device to communicate over the communication networks. For example, a partner provider computing device may include a mobile phone, a tablet, a smart watch, a laptop computer, a desktop computer, and/or any other suitable device having a processor, memory, and communication hardware. In some embodiments, the partner provider computing device may include a partner provider application that is configured to manage communications with partner on-demand providers and/or the management system 201. In various embodiments, the partner provider application may allow a user to accept a transport request, monitor the status of a matched transport request, obtain or generate navigation directions or a mapped route for a matched transport request, get paid for a transport request, monitor past rides, perform any other partner provider-oriented services related to the management system 201, and/or obtain any other partner provider-oriented information from the management system 201.

The roaming service 214 is configured to utilize a flexible API framework to selectively submit requests to partner on-demand providers based on a set of rules. For example, an indication that requestor application is active can be received. Roaming service 214 can submit one or more requests to an appropriate API of a partner on-demand provider to request information such as partner services, availability of partner providers, among other such information. In this example, API mapping and rule data store 222 can store mapping and rule information to map requests to the appropriate partner API. The ability to selectively submit requests allows for some aspects of a request to be fulfilled by a partner on-demand provider and other aspects of the request to be fulfilled by another on-demand providers and/or the management system 201. For example, while a transport request, location pick-up, drop-off, route, and pricing may be received and fulfilled by a partner on-demand provider, management system 201 might fulfill billing obligations, estimated time of arrival calculations, among other such determinations.

Roaming service 214 may include a software module that is configured to process transport requests, transport responses, and other communications between requestors and partner providers of the management system 201 to match a requestor and a partner provider for a requested service. For example, the roaming service 214 may be configured to access partner data store 218 and API mapping/rule data store 222 to identify available partner providers for a transport request from a requestor by identifying a geographic region associated with the pick-up location, determining an appropriate partner on-demand provider based on the geographic region and any rules to map appropriate requests one or more appropriate APIs of a partner on-demand provider. The roaming service may provide the transport request to the partner interface 208 with the partner API information so that the transport request may be sent to one or more available partner providers.

The roaming service 214 may send the transport request and/or the information from the transport request to one or more of the available partner on-demand providers to determine whether the available providers can determine whether a partner provider is interested in accepting the transport request. The available partner providers may receive the transport request through a partner provider application of the partner provider computing device, may evaluate the request, and may accept or deny the request by providing an input through the partner provider application. A transport response message may be sent to the management system 201 indicating whether a ride was accepted and including a partner provider identifier, a location of the partner provider, and/or any other suitable information to allow the management system 201 to process the request. Alternatively, the partner provider may ignore the request and after a predetermined period of time, the request may be considered denied and a corresponding transport response message may be transmitted to the management system 201. In some embodiments, no response may be sent unless a transport request is accepted and the ride will be assumed to be denied unless a response is received from the partner provider.

The roaming service 214 may receive the transport response, evaluate whether the partner provider accepted or declined the request, and may either find additional available partner providers for the request (if declined) or determine the request has been accepted and send matched transport information to the requestor computing device 202 and the partner provider computing device. The matched transport information may include partner provider information, requestor information, the pick-up location, the current location of the partner provider computing device, the current location of the requestor computing device, a requestor communication identifier, a provider communication identifier, an estimated time of arrival for the provider, and/or any other suitable information to allow the requestor and the partner provider to complete the requested service. The roaming service 214 may update the transport data store with the corresponding matched transport information for the matched ride.

The roaming service 212 may be configured to track the location of the partner provider computing device and the requestor computing device and provide location information to each of the respective devices to facilitate navigating the partner provider computing device to the requestor computing device (or vice versa), providing estimated time of arrival information, among other such functions. For example, the roaming service 214 may use an appropriate API to request location information for a partner provider. Using the location information, the roaming service can be configured to identify when the partner provider is within a threshold distance to a geographic request location and/or when a partner computing device requests a location of a requestor computing device and provide the respective location to the partner provider computing device. For instance, the roaming service may send a request to location module 234 in response to a matched ride. The roaming service 214 may receive a requestor computing device identifier, a partner provider computing device identifier, and a pick-up location associated with a matched ride and may track the progress of the partner provider computing device in relation to the request location. For example, the roaming service 214 may submit an appropriate API request to obtain and monitor the location of the partner provider computing device from and store such information in transport data store 224. Once the partner provider computing device is within a threshold distance of the request location, the roaming service 214 may send the location of the requestor computing device 202 to the partner provider computing device. The partner provider computing device may then calculate a proximity vector between the location of the partner provider computing device and the requestor computing device 232 to locate the exact location of the requestor computing device 202. Similarly, the roaming service 214 may identify and monitor the location of the partner provider computing device and send the location to the requestor computing device 232 upon being within a threshold distance to the partner provider computing device. In some embodiments, the roaming service 214 may periodically and/or upon another condition being met, send location updates to both the requestor computing device and the provider computing device for the location of the corresponding device (e.g., provider device location being sent to requestor device and vice versa).

In accordance with various embodiments, the roaming service 214 can manage payment between the user and any entities involved. As described, the entities can be one or more service providers. Accordingly, the roaming service can include one or more appropriate components operable to manage billing, payments, taxes, and any other appropriate payment obligations based on one or more exchange rates between the entities.

Figures 3A, 3B:
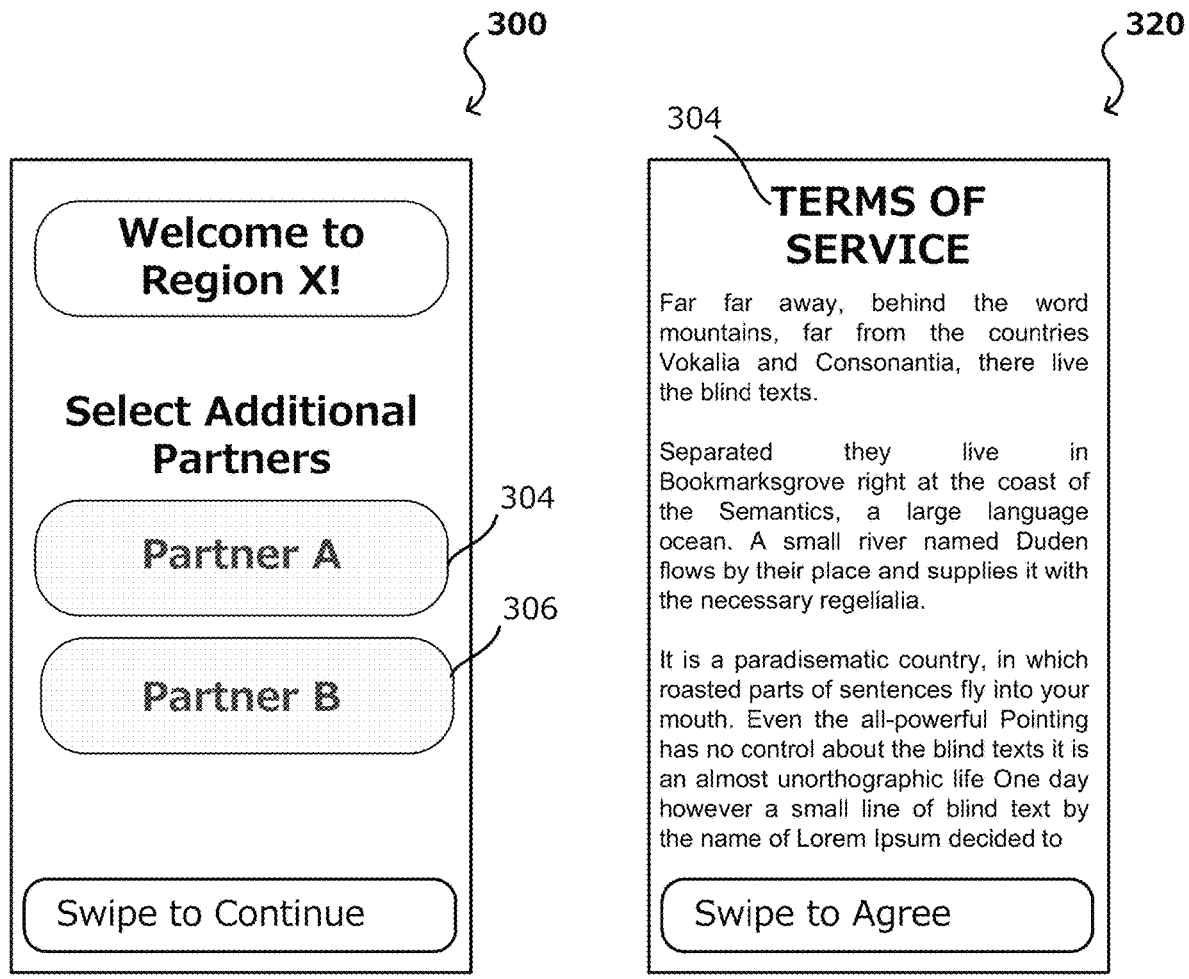
FIGS. 3A, 3B, and 3C illustrate example interfaces in accordance with various embodiments.

FIG. 3A illustrates an example interface 300 in accordance with various embodiments. As described, a user may desire access to services provided by a first on-demand provider in a region where services for the first on-demand provider are not available. In this example, when the application is active (e.g., opened), geographic location information associated with the user's computing device can be utilized to determine a geographic region from which the application is being used. At least one partner on-demand provider associated with the geographic region can be determined. In the situation where a user account has not been established between one of the available partner on-demand providers, that partner on-demand provider can be displayed on display screen of the user's computing service, as is shown in FIG. 3A. As shown in FIG. 3A, the user has opened an application in Region X. The application can be maintained by the first on-demand provider. The user may have an account with the first on-demand provider, which provides use of the application to access services offered by the first on-demand provider. In an embodiment, the first on-demand provider may not offer services or offer limited services in Region X but may develop a partnership with other on-demand providers that do offer services in Region X. The services offered by those providers can be accessed through the application provided by the first on-demand provider. In this example, the first on-demand provider is partnered with a second on-demand provider ("Partner A") 304 and a third on-demand provider ("Partner B") 306. The user can select Partner A, Partner B, or both of them. Once an indication of a preferred partner on-demand provider is received, a determination can be made whether terms of service have been accepted for the selected partner on-demand provider(s). In the situation where the terms of service have not been accepted, the terms of service 322 can be displayed on display screen of the user's computing device, as is shown in FIG. 3B. If more than one partner on-demand provider is selected, e.g., the user selects both Partner A and Partner B, the terms of service of the selected partner on-demand providers can be displayed in turn.

Figure 3C:
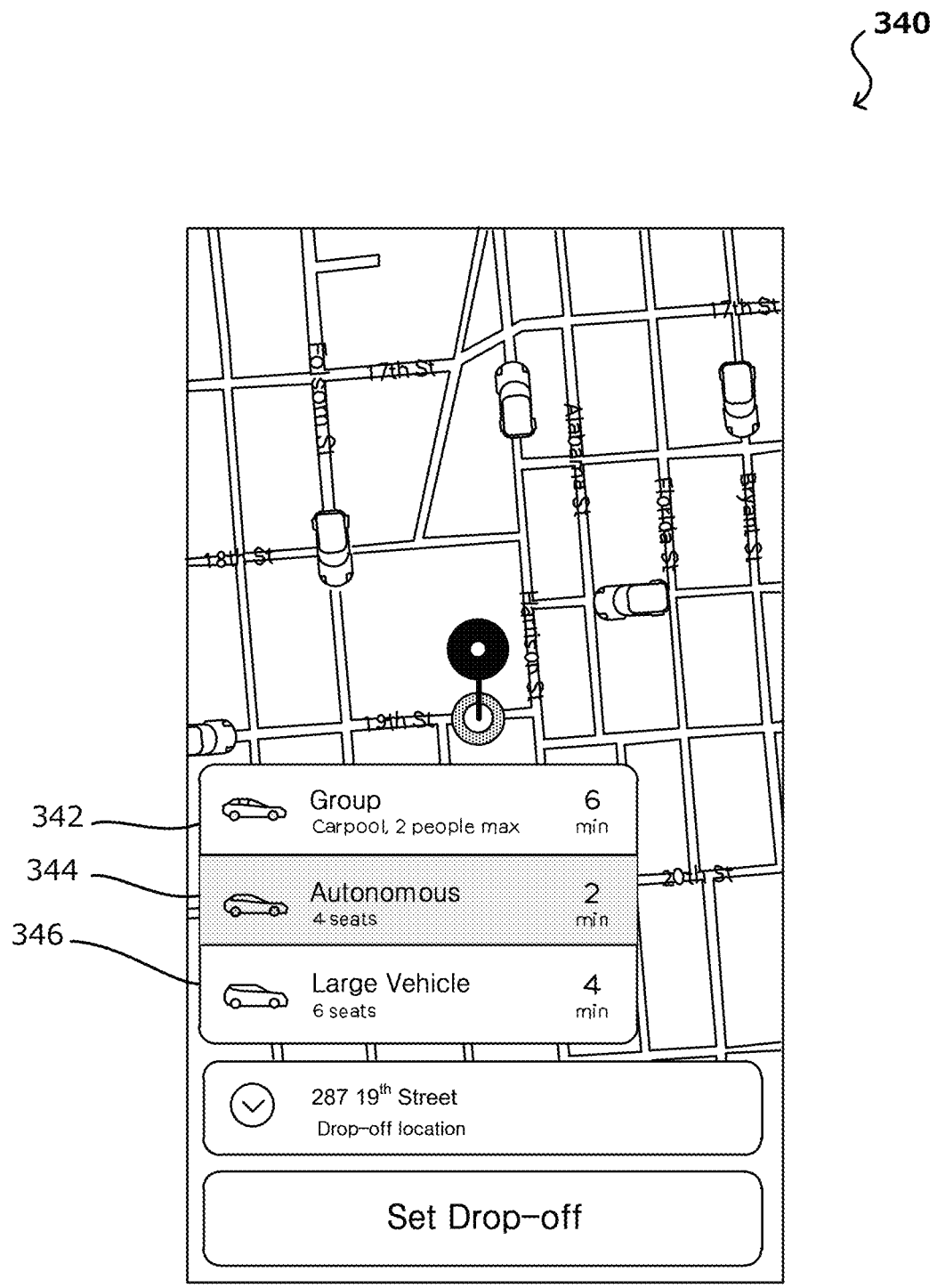

Once the terms of service have been accepted, or determined to have previously been accepted, the application can display a request interface. FIG. 3C displays example request interface 302. In this example, services offered by Partner A and/or Partner B can be offered through the application. As described, various embodiments provide for selectively integrating with various on-demand providers based on reliability factors, security concerns, user preferences, and/or other criteria. As shown in FIG. 3C, by utilizing a flexible API framework to selectively make requests to partner on-demand providers, the first on-demand provider can enable access to services otherwise not currently available by the first on-demand provider. In this example, as shown in FIG. 3C, the user can request a carpool 342, an autonomous vehicle 344, or a large vehicle 346. It should be noted that various other services can be accessed utilizing the flexible API framework. This can include selectively accessing services offered by each of the partner on-demand providers, and/or utilizing services offered by the first on-demand provider, among other such options. It should be further noted that each of the partner on-demand providers may utilize the flexible API framework to extend their service offerings to other partner on-demand providers. For example, in various embodiments, any one of a number of on-demand providers can expose their services to on-demand providers using the flexible API framework. In certain embodiments, a standardized framework can be utilized where the request for service offerings, information, etc. is universal between partner on-demand providers. In this way, mapping information and other such information to map a request from one on-demand provider to another on-demand provider may not be necessary as partner on-demand providers use common request calls.

Figure 4:
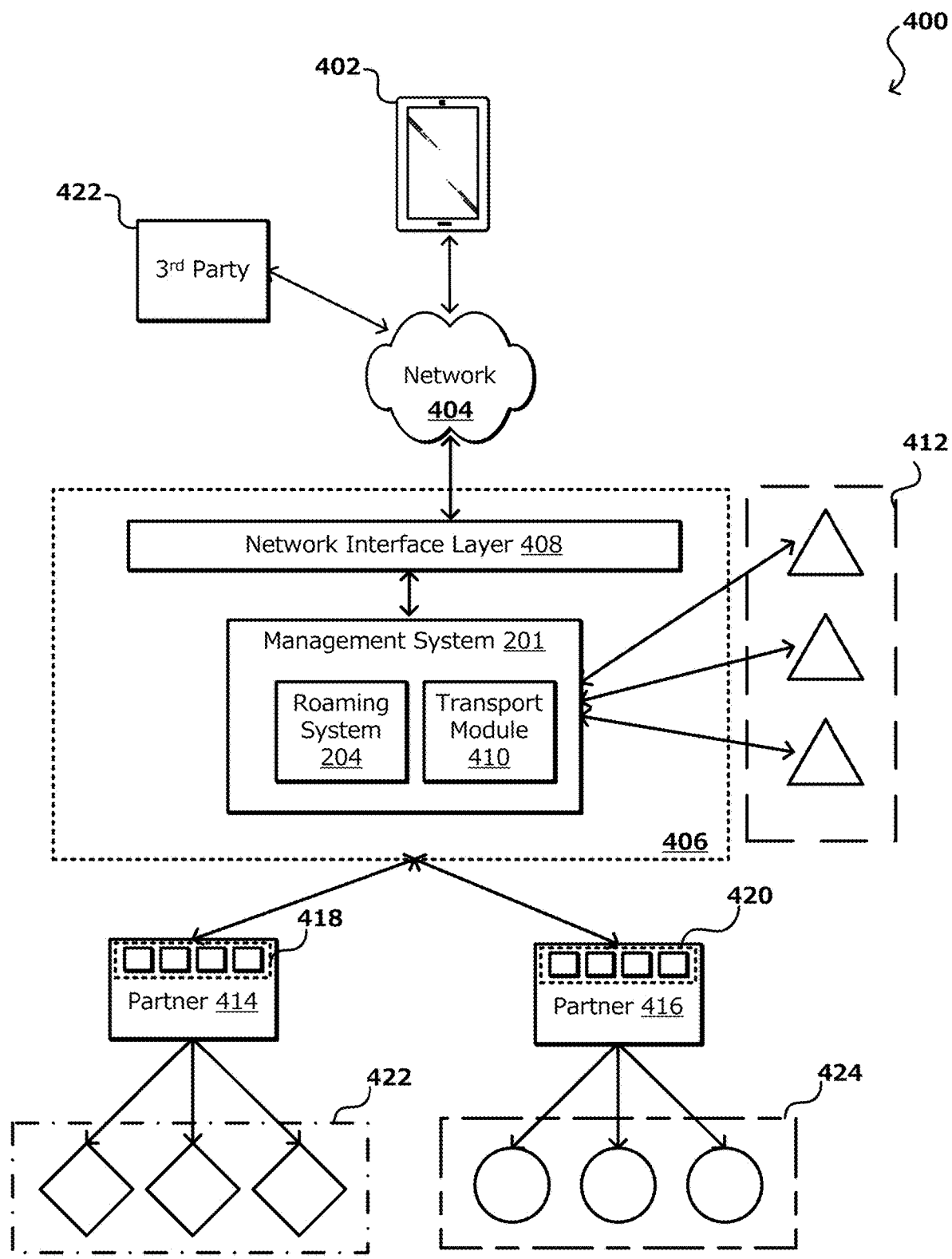
FIG. 4 illustrates an example environment for utilizing a flexible API framework in accordance with various embodiments.

FIG. 4 illustrates an example environment 400 for utilizing a flexible API framework in accordance with various embodiments. In this example, a user may utilize a computing device 402 having operating thereon an application to access services provided by one or more on-demand providers. The computing device can send a request and/or information across at least one appropriate network 404, such as may include the Internet, a local area network (LAN), a cellular network, and the like. The request and/or information can be sent to an appropriate on-demand provider 406, as may provide one or more services, systems, or applications for processing such requests.

In this example, the request and/or information is received to a network interface layer 408 of the content provider 406. The network interface layer can include any appropriate components known or used to receive requests from across a network, such as may include one or more application programming interfaces (APIs) or other such interfaces for receiving such requests. The network interface layer 408 might be owned and operated by the provider, or leveraged by the provider as part of a shared resource or "cloud" offering. The network interface layer can receive and analyze the information, and cause at least a portion of the information in the request to be directed to an appropriate system or service, such as management system 201 as illustrated in FIG. 2. As described, the management system 201 can utilize a flexible API framework to selectively make requests to partner on-demand providers as well as satisfy at least some of those requests.

A transport module 410 in this example includes components operable to process transport requests, transport responses, and other communications between user computing device 402 and providers 412 of the on-demand provider 406 to match a requestor and a provider for a requested service. For example, the transport module 410 may be configured to identify one of providers 412 to fulfill a transport request from user computing device 402 by identifying a geographic region associated with the pick-up location and may search a provider information data store to identify available providers within a predetermined distance of the pick-up location and/or the geographic region. The transport module 410 may provide the transport request to a provider interface with the provider contact information or provider identifier so that the transport request may be sent to one or more available providers. The transport module 410 may send the transport request and/or the information from the transport request to one or more of the available providers (e.g., providers 412) to determine whether the available providers are interested in accepting the transport request. The one or more available providers may receive the transport request through a respective provider application of a respective provider computing device, may evaluate the request, and may accept or deny the request by providing an input through a respective provider application. A transport response message may be sent to the transport module 410 indicating whether a ride was accepted and including a provider identifier, a location of the provider, and/or any other suitable information to allow the transport module 410 to process the response. Alternatively, the provider may ignore the request and after a predetermined period of time, the request may be considered denied and a corresponding ride response message may be transmitted to the transport module 410. In some embodiments, no response may be sent unless a transport request is accepted and the ride will be assumed to be denied unless a response is received from the provider.

The transport module 410 may receive the transport response, evaluate whether the provider accepted or declined the request, and may either find additional available providers for the request (if declined) or determine the transport request has been accepted and send matched ride information to the requestor computing device 402 and the provider computing device. The matched ride information may include provider information, requestor information, the pick-up location, the current location of the provider computing device, the current location of the requestor computing device, a requestor communication identifier, a provider communication identifier, an estimated time of arrival for the provider, and/or any other suitable information to allow the requestor and the provider to complete the requested service. The transport module 410 may update a matched rides data store with the corresponding matched ride information for the matched ride.

As described, a user may attempt to access a service provided by on-demand provider 406 that may be limited and/or not available. In this example, the roaming system 204 may receive a transport request or other such request from a requestor application of the requestor computing device 402 and send the transport request to one of the partner on-demand providers (414, 416.) For example, geographic location information associated with the requestor computing device 402 can be provided to management system 201. Management system 201 can use the geographic location information to determine a geographic region associated with the geographic location information. The management system 201 can determine at least one partner on-demand provider (414, 416) associated with the geographic region. Thereafter, the requestor computing device 402 can request a service such as a ride, monitor the status of a matched ride, pay for a ride, monitor past rides, perform any other requestor-oriented services related to the management system 201, and/or obtain any other requestor-oriented information from the management system 201 and/or partner on-demand providers.

For example, partner on-demand providers (414, 416) may each be associated with a plurality of providers (e.g., 422 and 424, respectively). Management system 201 can be configured to utilize a flexible API framework to selectively submit requests to partner on-demand providers based on a set of rules. For example, a request can be received from requestor computing device 402. Management system 201 can analyze the request and send one or more requests to an appropriate API (418,420) of a partner on-demand provider to request information such as partner services, availability of partner providers, among other such information. Based on the set of rules, some aspects of a request may be fulfilled by the partner on-demand providers (414, 416) and other aspects of the request may be fulfilled by on-demand provider 406. For example, while a transport request, location pick-up, drop-off, route, and pricing may be received and fulfilled by a partner on-demand provider (414, 416), management system 201 might fulfill billing obligations, estimated time of arrival calculations, among other such determinations. In another example, a third party provider may utilize the flexible API framework to receive requests from a plurality of requestor devices. Third party providers can include, for example, food delivery providers and other delivery providers, beauty service providers (e.g., hair, nails, skin), wellness providers (e.g., yoga, massage, fitness, etc.), among other such providers. Additionally or alternatively, the management system may partner with the third party providers to facilitate access to such services via their application.

Figure 5:
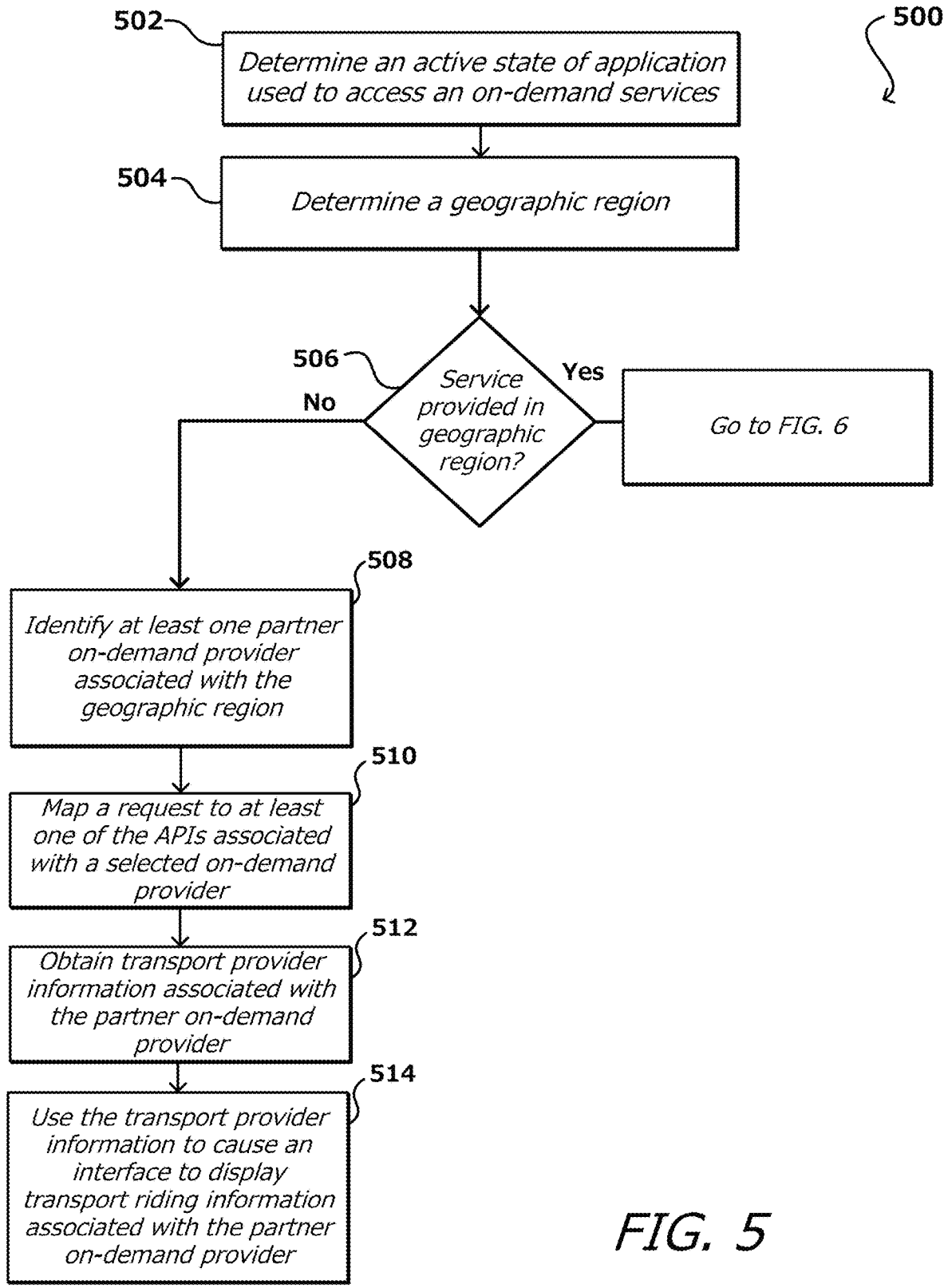
FIG. 5 illustrates an example process utilizing a flexible API framework in accordance with various embodiments.

FIG. 5 illustrates an example process 500 for utilizing a flexible API framework to selectively integrate with various on-demand providers based on reliability factors, security concerns, user preferences, and/or other criteria in accordance with various embodiments. It should be understood that there can be additional, fewer, or alternative steps performed in similar or alternative orders, or in parallel, within the scope of the various embodiments unless otherwise stated. As described, a user may attempt to access a service provided by an on-demand provider that may be limited and/or not available for a particular location. In this example, an active state of an application used to access on-demand services provided by an on-demand provider is determined 502. When it is determined that the application is active, geographic location information associated with the user's computing device can be determined and the geographic location information can be used to determine 504 a geographic region. A determination 506 can be made whether the on-demand provider provides service in the geographic region. In the situation where the on-demand provider does not provide service in the geographic region, a request submitted through the application can be fulfilled by a partner on-demand provider. This can include, for example, identifying 508 at least one partner on-demand provider associated with the geographic region. The user can be provided with a list of available partner on-demand providers, where each of the partner on-demand providers can be associated with one or more API's for which in interact with. The user may select one or more of the partner on-demand providers to engage with. In certain embodiments, the management system may select a partner on-demand provider based on selection criteria such as user preference, location, and status of service providers associated with the partner on-demand provider near a request location. In various embodiments, the management system may monitor system resources and control efficient resource allocation based on demand-matching between requestors and partner on-demand providers distributed through a geographic area. A request can be mapped 510 to at least one of the one or more APIs associated with the selected partner on-demand provider based on a set of rules, criteria, security concerns, user account preferences or other such information to obtain 512 transport provider information associated with the partner on-demand provider. For example, user account preferences may indicate that a user prefers one partner service provider over another. In this situation, the preferred partner service provider or at least aspects of the service provided by the preferred service provider may be utilized. In another example, security concerns and/or detected fraudulent activity associated with aspects of a partner service provider may cause a subset of the services available via API requests to be utilized while other services available via API requests through other partner service providers may be utilized. For example, a partner service provider may determine transport distance information that does not meet a threshold level of confidence. The distance information may be used for billings purposes. As such, because the distance determination is questionable, a partner service provider that at least satisfies a threshold level of confidence may be selected to fulfill the request or aspects of the request. The transport service provider information can be used 514 to cause an interface to display transport riding information associated with the partner on-demand provider. For example, the transport riding information can include sufficient data to determine partner services, availability of partner providers, among other such information. Thereafter, a request can be submitted to the partner on-demand service requesting a service such as a ride, monitor the status of a matched ride, pay for a ride, monitor past rides, perform any other requestor-oriented services related to the on-demand provider, and/or obtain any other requestor-oriented information from the on-demand provider and/or partner on-demand provider.

Figure 6:
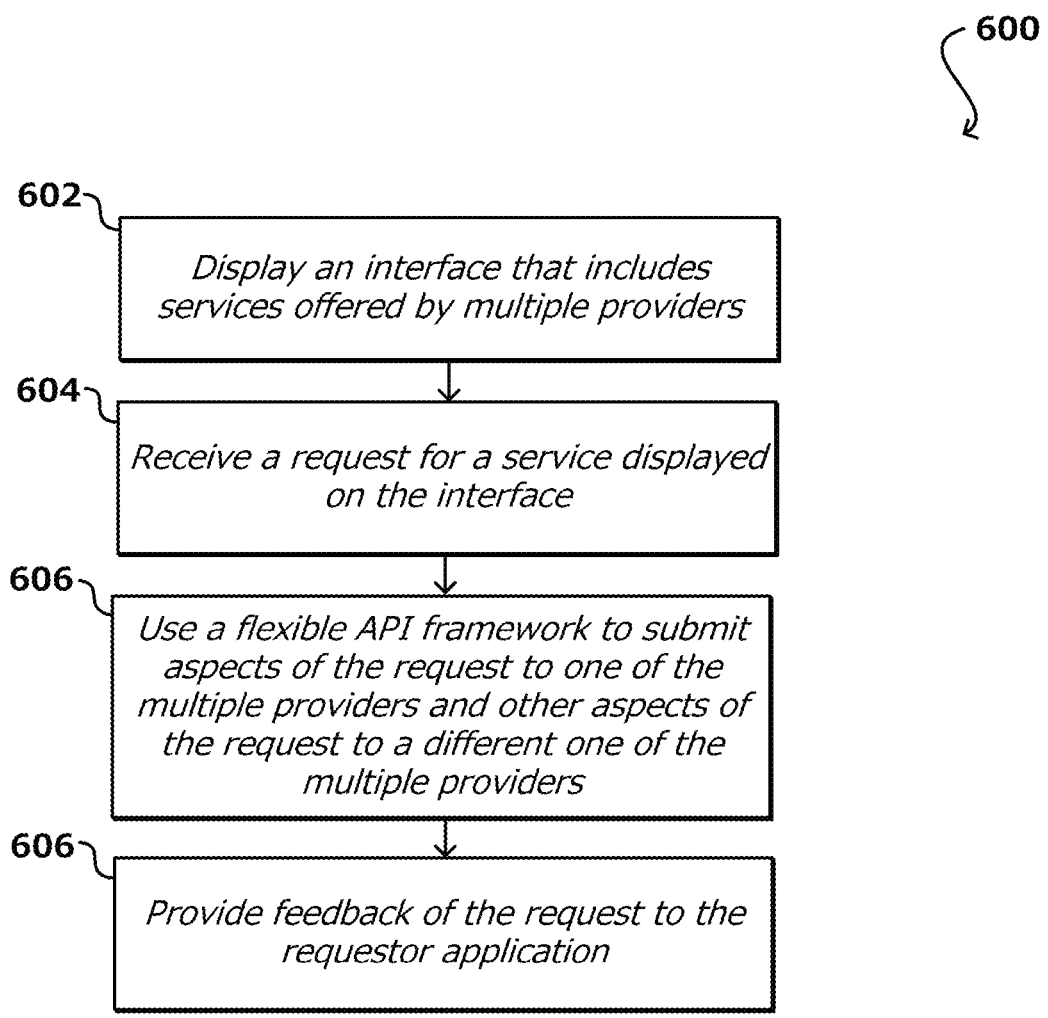
FIG. 6 illustrates an example process utilizing a flexible API framework to access aspects of partner services in accordance with various embodiments.

In the situation where the on-demand provider does provide services in the region, services can be provided by the on-demand provider, partner on-demand providers, or a combination thereof. For example, FIG. 6 illustrates an example process 600 for the situation where the on-demand service provider does provide services in the region. In this example, a management system can be configured to utilize a flexible API framework to selectively submit requests to partner on-demand providers. For example, an interface can be displayed 602 that includes services offered by multiple on-demand provides, such as one of partner on-demand providers, the on-demand provider, or one or more third parties. A request can be received 604 for a service displayed on the interface. A flexible API framework can be used 606 to submit aspects of the request to at least one partner on-demand provider and other aspects of the request can be fulfilled by a management system associated with the on-demand provider. For example, while a transport request, location pick-up, drop-off, route, and pricing may be received and fulfilled by a partner on-demand provider, the management system might fulfill billing obligations, estimated time of arrival calculations, among other such determinations. Thereafter, feedback of the request can be provided 606 to the requestor application. This can include, for example, travel routes, pick-up estimates, drop-off estimates, traffic information, and/or any other relevant information.

Figure 7:
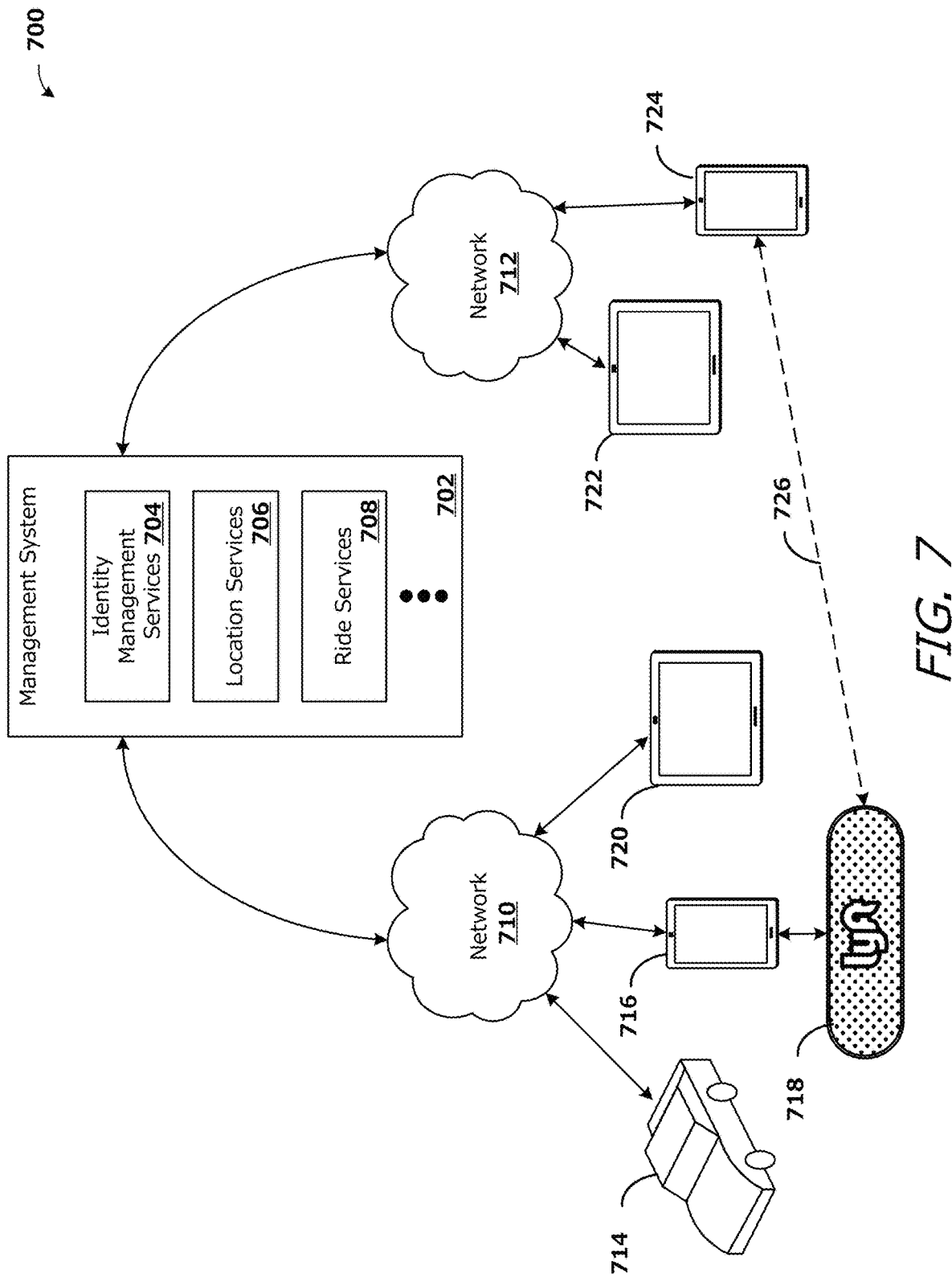
FIG. 7 illustrates an example requestor/provider management environment, in accordance with various embodiments.

FIG. 7 shows a requestor/provider management environment 700, in accordance with various embodiments. As shown in FIG. 7, a management system 702 can be configured to provide various services to requestor and provider devices. Management system 702 can run one or more services or software applications, including identity management services 704, location services 706, ride services 708, or other services. Although three services are shown as being provided by management system 702, more or fewer services may be provided in various implementations. In various embodiments, management system 702 may include one or more general purpose computers, server computers, clustered computing systems, cloud-based computing systems, or any other computing systems or arrangements of computing systems. Management system 702 may be configured to run any or all of the services and/or software applications described with respect to various embodiments of the present techniques described herein. In some embodiments, management system 702 can run any appropriate operating system as well as various server applications, such as common gateway interface (CGI) servers, JAVA® servers, hypertext transport protocol (HTTP) servers, file transfer protocol (FTP) servers, database servers, etc.

Identity management services 704 may include various identity services, such as access management and authorization services for requestors and providers when interacting with management system 702. This may include, e.g., authenticating the identity of providers and determining that the providers are authorized to provide services through management system 702. Similarly, requestors' identities may be authenticated to determine whether the requestor is authorized to receive the requested services through management system 702. Identity management services 704 may also control access to provider and requestor data maintained by management system 702, such as driving and/or ride histories, personal data, or other user data. Location services 706 may include navigation and/or traffic management services and user interfaces, or other location services.

In various embodiments, ride services 708 may include ride matching and management services to connect a requestor to a provider. Ride services 708 may include a user interface and or may receive data from requestors and providers through applications executing on their respective devices. Ride services 708 may, e.g., confirm the identity of requestors and providers using identity management services 704, and determine that each user is authorized for the requested ride service. In some embodiments, ride services 708 can identify an appropriate provider using a location obtained from a requestor and location services 706 to identify, e.g., a closest provider. As such, ride services 708 can manage the distribution and allocation of provider and requestor resources, consistent with embodiments described herein.

Management system 702 can connect to various devices through network 710 and 712. Networks 710, 712 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 710, 712 can include local area networks (LAN), such as Ethernet, Token-Ring or other LANs. Networks 710, 712 can include a wide-area network and/or the Internet. In some embodiments, networks 710, 712 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 710, 712 can include a mobile network, such as a mobile telephone network, cellular network, satellite network, or other mobile network. Networks 710, 712 may be the same as communication network 170 in FIG. 1. In some embodiments, networks 710, 712 may each include a combination of networks described herein or other networks as are known to one of ordinary skill in the art.

Users may then utilize one or more services provided by management system 702 using applications executing on provider and requestor devices. As shown in FIG. 7, provider computing devices 714, 716, 718, and/or 720 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 710, 712. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 714 can include a vehicle-integrated computing device, such as a vehicle navigation system, or other computing device integrated with the vehicle itself.

In some embodiments, provider computing device 718 can include a provider communication device configured to communicate with users, such as drivers, passengers, pedestrians, and other users. In some embodiments, provider communication device 718 can communicate directly with management system 702 or through another provider computing device, such as provider computing device 716. In some embodiments, a requestor computing device can communicate 726 directly with provider communication device 718 over a peer-to-peer connection, Bluetooth connection, NFC connection, ad hoc wireless network, or any other communication channel or connection. Although particular devices are shown as communicating with management system 702 over networks 710 and 712, in various embodiments, management system 702 can expose an interface, such as an application programming interface (API) or service provider interface (SPI) to enable various third parties which may serve as an intermediary between end users and management system 702.

Although requestor/provider management environment 700 is shown with four provider devices and two requestor devices, any number of devices may be supported. The various components shown and described herein may be implemented in hardware, firmware, software, or combinations thereof. Although one embodiment of a requestor/provider management environment is depicted in FIG. 7, this is merely one implementation and not meant to be limiting.

Figure 8:
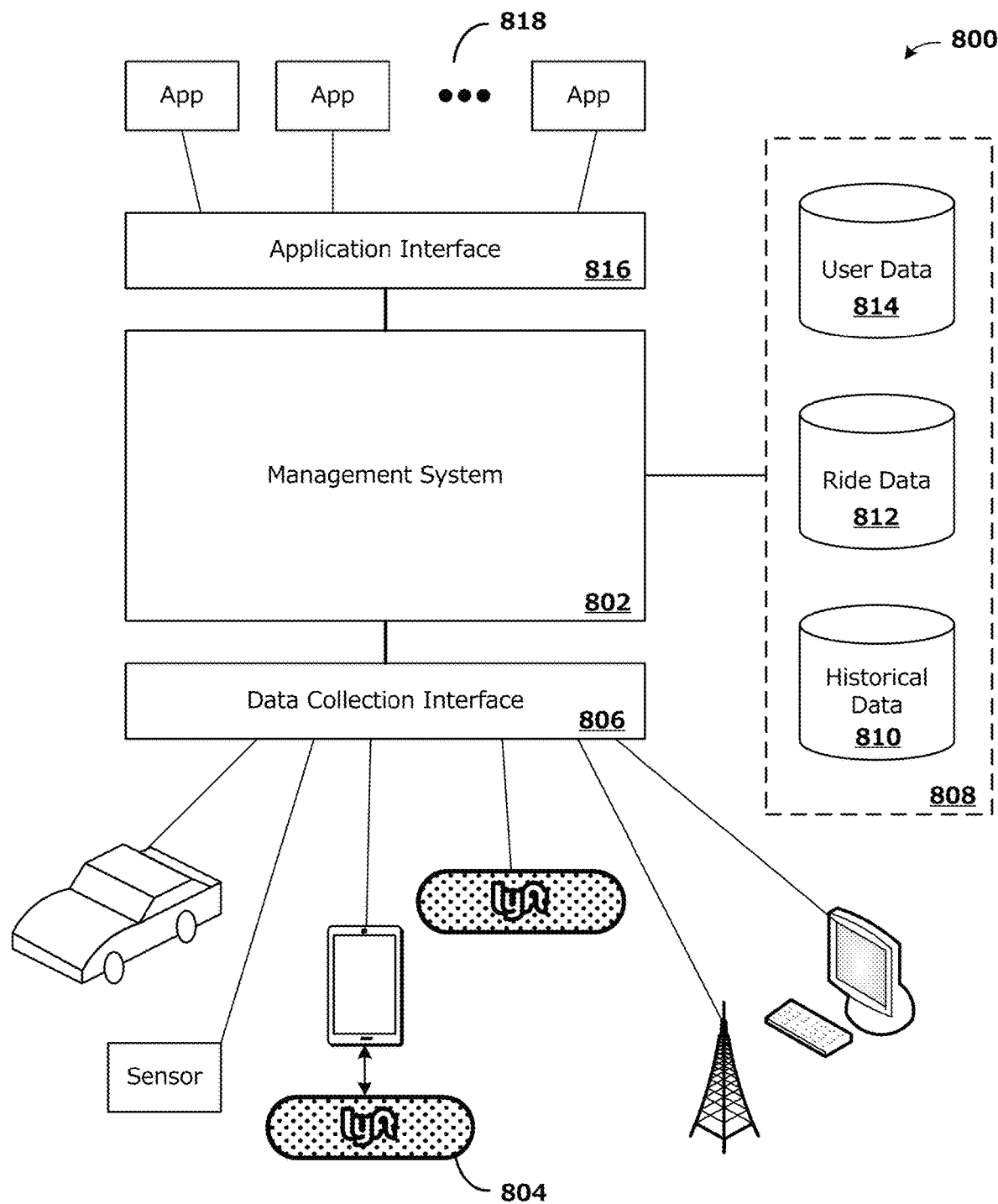
FIG. 8 illustrates an example data collection and application management system, in accordance with various embodiments.

FIG. 8 shows a data collection and application management environment 800, in accordance with various embodiments. As shown in FIG. 8, management system 802 may be configured to collect data from various data collection devices 804 through a data collection interface 806. As discussed above, management system 802 may include one or more computers and/or servers or any combination thereof. Data collection devices 804 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 806 can include, e.g., an extensible device framework configured to support interfaces for each data collection device. In various embodiments, data collection interface 806 can be extended to support new data collection devices as they are released and/or to update existing interfaces to support changes to existing data collection devices. In various embodiments, data collection devices may communicate with data collection interface 806 over one or more networks. The networks may include any network or communication protocol as would be recognized by one of ordinary skill in the art, including those networks discussed above.

As shown in FIG. 8, data received from data collection devices 804 can be stored in data store 808. Data store 808 can include one or more data stores, such as databases, object storage systems and services, cloud-based storage services, and other data stores. For example, various data stores may be implemented on a non-transitory storage medium accessible to management system 802, such as historical data store 810, ride data store 812, and user data store 814. Data stores 808 can be local to management system 802, or remote and accessible over a network, such as those networks discussed above or a storage-area network or other networked storage system. In various embodiments, historical data 810 may include historical traffic data, weather data, request data, road condition data, or any other data for a given region or regions received from various data collection devices. Ride data 812 may include route data, request data, timing data, and other ride related data, in aggregate and/or by requestor or provider. User data 814 may include user account data, preferences, location history, and other user-specific data. Although particular data stores are shown, any data collected and/or stored according to the various embodiments described herein may be stored in data stores 808.

As shown in FIG. 8, an application interface 816 can be provided by management system 802 to enable various apps 818 to access data and/or services available through management system 802. Apps 818 can run on various user devices (including provider and requestor computing devices, such as those discussed above) and/or may include cloud-based or other distributed apps configured to run across various devices (e.g., computers, servers, or combinations thereof). Apps 818 may include, e.g., aggregation and/or reporting apps which may utilize data 808 to provide various services (e.g., third-party transport request and management apps). In various embodiments, application interface 816 can include an API and/or SPI enabling third party development of apps 818. In some embodiments, application interface 816 may include a web interface, enabling web-based access to data 808 and/or services provided by management system 802. In various embodiments, apps 818 may run on devices configured to communicate with application interface 816 over one or more networks. The networks may include any network or communication protocol as would be recognized by one of ordinary skill in the art, including those networks discussed above, in accordance with an embodiment of the present disclosure.

Although a particular implementation of environment 800 is shown in FIG. 8, this is for illustration purposes only and not intended to be limited. In some embodiments, environment 800 may include fewer or more components, as would be recognized by one or ordinary skill in the art.

Figure 9:
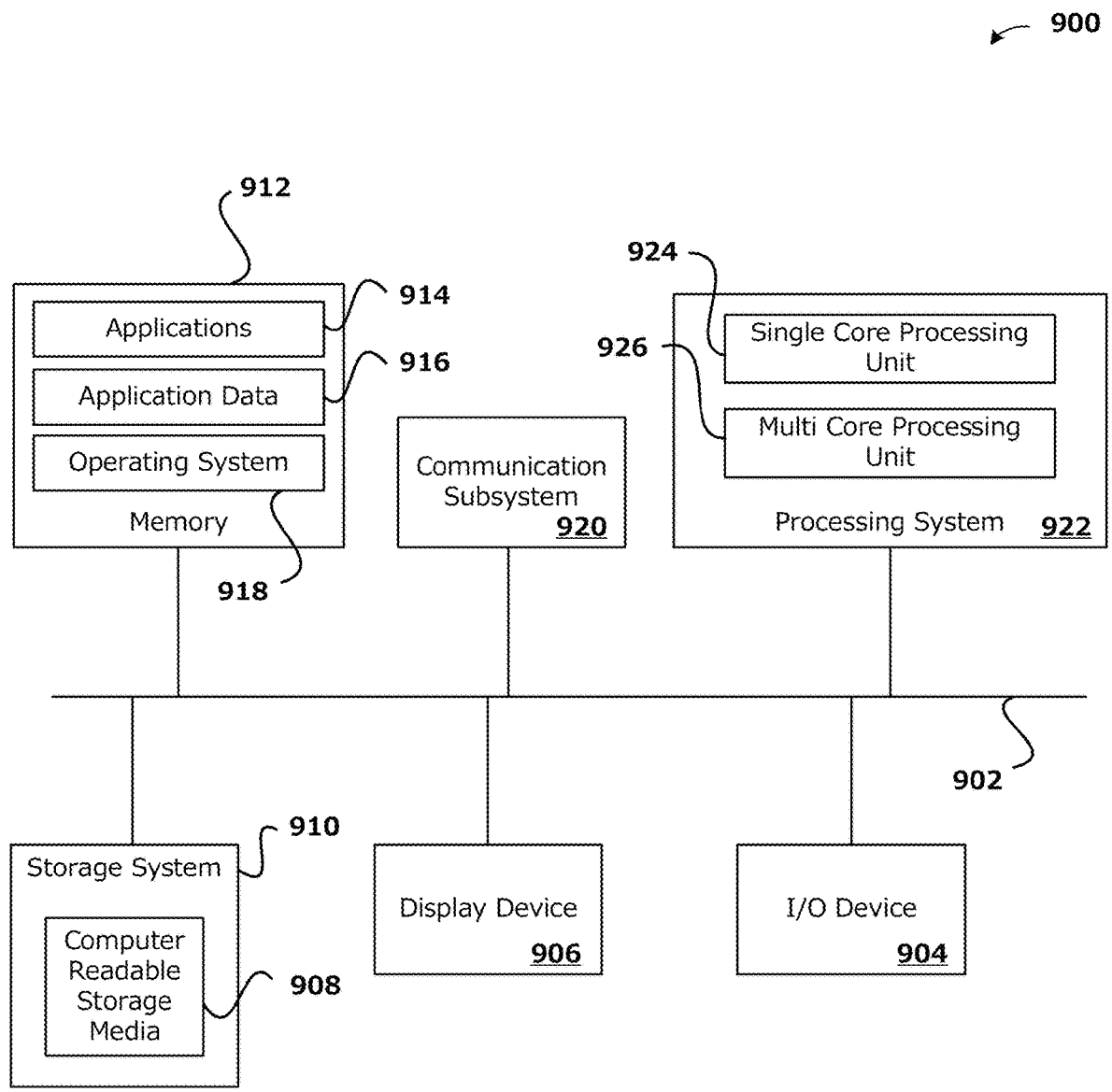
FIG. 9 illustrates an example computer system, in accordance with various embodiments.

FIG. 9 shows an example computer system 900, in accordance with various embodiments. In various embodiments, computer system 900 may be used to implement any of the systems, devices, or methods described herein. In some embodiments, computer system 900 may correspond to any of the various devices described herein, including, but not limited, to mobile devices, tablet computing devices, wearable devices, personal or laptop computers, vehicle-based computing devices, or other devices or systems described herein. As shown in FIG. 9, computer system 900 can include various subsystems connected by a bus 902. The subsystems may include an I/O device subsystem 904, a display device subsystem 906, and a storage subsystem 910 including one or more computer readable storage media 908. The subsystems may also include a memory subsystem 912, a communication subsystem 920, and a processing subsystem 922.

In system 900, bus 902 facilitates communication between the various subsystems. Although a single bus 902 is shown, alternative bus configurations may also be used. Bus 902 may include any bus or other component to facilitate such communication as is known to one of ordinary skill in the art. Examples of such bus systems may include a local bus, parallel bus, serial bus, bus network, and/or multiple bus systems coordinated by a bus controller. Bus 902 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 904 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 904 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 900 may include a display device subsystem 906. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 906 may include a controller and/or interface for controlling and/or communicating with an external display, such as any of the above-mentioned display technologies.

As shown in FIG. 9, system 900 may include storage subsystem 910 including various computer readable storage media 908, such as hard disk drives, solid state drives (including RAM-based and/or flash-based SSDs), or other storage devices. In various embodiments, computer readable storage media 908 can be configured to store software, including programs, code, or other instructions, that is executable by a processor to provide functionality described herein. In some embodiments, storage system 910 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 910 can include a media reader, card reader, or other storage interface to communicate with one or more external and/or removable storage devices. In various embodiments, computer readable storage media 908 can include any appropriate storage medium or combination of storage media. For example, computer readable storage media 908 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be transmitted and/or received.

Memory subsystem 912 can include various types of memory, including RAM, ROM, flash memory, or other memory. Memory 912 can include SRAM (static RAM) or DRAM (dynamic RAM). In some embodiments, memory 912 can include a BIOS (basic input/output system) or other firmware configured to manage initialization of various components during, e.g., startup. As shown in FIG. 9, memory 912 can include applications 914 and application data 916. Applications 914 may include programs, code, or other instructions, that can be executed by a processor. Applications 914 can include various applications such as browser clients, location management applications, ride management applications, data management applications, and any other application. Application data 916 can include any data produced and/or consumed by applications 914. Memory 912 can additionally include operating system 918, such as macOS®, Windows®, Linux®, various UNIX® or UNIX- or Linux-based operating systems, or other operating systems.

System 900 can also include a communication subsystem 920 configured to facilitate communication between system 900 and various external computer systems and/or networks (such as the Internet, a local area network (LAN), a wide area network (WAN), a mobile network, or any other network). Communication subsystem 920 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. For example, the communication network is shown as communication network 90 in FIG. 1. Additionally, or alternatively, communication subsystem 920 can include hardware and/or software components to communicate with satellite-based or ground-based location services, such as GPS (global positioning system). In some embodiments, communication subsystem 920 may include, or interface with, various hardware or software sensors. The sensors may be configured to provide continuous or and/or periodic data or data streams to a computer system through communication subsystem 920

As shown in FIG. 9, processing system 922 can include one or more processors or other devices operable to control computing system 900. Such processors can include single core processors 924, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 922, such as processors 924 and 926, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    identifying a geographic region associated with a requestor computing device, the requestor computing device having operating thereon an application operable to submit transport service requests, wherein the application is maintained by a first transport service provider associated with a first set of transportation providers;
    determining, based on the geographic region, a second transport service provider associated with a second set of transportation providers, the second transport service provider associated with one or more application program interfaces (APIs) for which to interact with the second transport service provider;
    digitally communicating, through at least one API of the one or more APIs, a transport service request to an application of the second transport service provider to request a transportation provider;
    receiving from the application of the second transport service provider, through the at least one API of the one or more APIs, a location of a selected transportation provider, from the second set of transportation providers, dispatched to fulfill the transport service request; and
    providing, for display on a graphical user interface of the application of the first transport service provider on the requestor computing device, the location of the selected transportation provider dispatched to fulfill the transport service request.

2. The computer-implemented method of claim 1, further comprising:
   providing for display one or more transport service providers associated with the geographic region; and
   receiving information indicating a selection of the second transport service provider.

3. The computer-implemented method of claim 1, further comprising identifying the geographic region associated with the requestor computing device based on a global positioning system (GPS) communication from the requestor computing device.

4. The computer-implemented method of claim 1, further comprising:
   providing, for display on the graphical user interface of the application of the first transport service provider on the requestor computing device, an onboarding page associated with the second transport service provider, the onboarding page including a terms of service associated with the second transport service provider.

5. The computer-implemented method of claim 1, further comprising determining the second transport service provider upon identifying that the first set of transportation providers are unavailable within the geographic region.

6. The computer-implemented method of claim 1, further comprising:
   utilizing the at least one API to receive, from the application of the second transport service provider, service types available via the second transport service provider; and
   wherein the selected transportation provider dispatched to fulfill the transport service request is based on a selection of a service type from the service types available via the second transport service provider.

7. The computer-implemented method of claim 1, wherein the at least one API of the one or more APIs is based on a set of rules, wherein the set of rules is based at least in part on user preferences in a user profile associated with the first transport service provider or reliability criteria associated with the second transport service provider.

8. The computer-implemented method of claim 1, further comprising:
   utilizing the at least one API to receive, from the application of the second transport service provider, a route corresponding to the transport service request and location updates of the selected transportation provider; and
   causing a map-based graphical user interface of the application of the first transport service provider on the requestor computing device to display the route corresponding to the transport service request and location updates of the selected transportation provider.

9. The computer-implemented method of claim 1, further comprising:
   utilizing the at least one API to receive, from the application of the second transport service provider, price information corresponding to the transport service request; and
   receiving payment for the transport service request within the application of the first transport service provider on the requestor computing device.

10. A non-transitory computer-readable medium storing instructions that, when executed by at least one processor, cause a computer system to:
    identify a geographic region associated with a requestor computing device, the requestor computing device having operating thereon an application operable to submit transport service requests, wherein the application is maintained by a first transport service provider associated with a first set of transportation providers;
    determine, based on the geographic region, a second transport service provider associated with a second set of transportation providers, the second transport service provider associated with one or more application program interfaces (APIs) for which to interact with the second transport service provider;
    digitally communicate, through at least one API of the one or more APIs, a transport service request to an application of the second transport service provider to request a transportation provider;
    receive from the application of the second transport service provider, through the at least one API of the one or more APIs, a location of a selected transportation provider, from the second set of transportation providers, dispatched to fulfill the transport service request; and
    provide, for display on a graphical user interface of the application of the first transport service provider on the requestor computing device, the location of the selected transportation provider dispatched to fulfill the transport service request.

11. The non-transitory computer-readable medium of claim 10, further comprising instructions that, when executed by the at least one processor, cause the computer system to:
    provide for display one or more transport service providers associated with the geographic region; and
    receive information indicating a selection of the second transport service provider.

12. The non-transitory computer-readable medium of claim 10, wherein determining the second transport service provider is further based at least in part on user preference information associated with a user account of the first transport service provider.

13. The non-transitory computer-readable medium of claim 10, further comprising instructions that, when executed by the at least one processor, cause the computer system to provide, for display on the graphical user interface of the application of the first transport service provider on the requestor computing device, an onboarding page associated with the second transport service provider, the onboarding page including a terms of service associated with the second transport service provider.

14. The non-transitory computer-readable medium of claim 13, further comprising instructions that, when executed by the at least one processor, cause the computer system to:
    receive, from the requestor computing device, an indication of an acceptance of the terms of service; and
    request, through the at least one API of the one or more APIs, an account creation with the second transport service provider.

15. The non-transitory computer-readable medium of claim 10, further comprising instructions that, when executed by the at least one processor, cause the computer system to:
    utilize the at least one API to receive, from the application of the second transport service provider, service types available via the second transport service provider; and
    wherein the selected transportation provider dispatched to fulfill the transport service request is based on a selection of a service type from the service types available via the second transport service provider.

16. A system comprising:
    at least one processor; and at least one non-transitory computer-readable storage medium storing instructions that, when executed by the at least one processor, cause the system to:
- identify a geographic region associated with a requestor computing device, the requestor computing device having operating thereon an application operable to submit transport service requests, wherein the application is maintained by a first transport service provider associated with a first set of transportation providers;
- determine, based on the geographic region, a second transport service provider associated with a second set of transportation providers, the second transport service provider associated with one or more application program interfaces (APIs) for which to interact with the second transport service provider;
- digitally communicate, through at least one API of the one or more APIs, a transport service request to an application of the second transport service provider to request a transportation provider;
- receive from the application of the second transport service provider, through the at least one API of the one or more APIs, a location of a selected transportation provider, from the second set of transportation providers, dispatched to fulfill the transport service request; and
- provide, for display on a graphical user interface of the application of the first transport service provider on the requestor computing device, the location of the selected transportation provider dispatched to fulfill the transport service request.

17. The system of claim 16, further comprising instructions that, when executed by the at least one processor, cause the system to:
- provide for display one or more transport service providers associated with the geographic region; and
- receive information indicating a selection of the second transport service provider.

18. The system of claim 16, wherein determining the second transport service provider is further based at least in part on user preference information associated with a user account of the first transport service provider.

19. The system of claim 16, wherein the at least one API of the one or more APIs is based on a set of rules, wherein the set of rules is based at least in part on user preferences in a user profile associated with the first transport service provider or reliability criteria associated with the second transport service provider.

20. The system of claim 16, further comprising instructions that, when executed by the at least one processor, cause the system to:
- utilize the at least one API to receive, from the application of the second transport service provider, service types available via the second transport service provider; and
- wherein the selected transportation provider dispatched to fulfill the transport service request is based on a selection of a service type from the service types available via the second transport service provider.

* * * * *